United States Patent [19]
Walker

[11] Patent Number: 5,369,504
[45] Date of Patent: Nov. 29, 1994

[54] METHOD AND APPARATUS FOR REDUCING IMAGE DISTORTION IN AN ASYNCHRONOUS INPUT SCANNER

[75] Inventor: John O. Walker, Rochester, N.Y.

[73] Assignee: Xerox Corporation, Stamford, Conn.

[21] Appl. No.: 865,548

[22] Filed: Apr. 9, 1992

[51] Int. Cl.[5] .............................................. H04N 1/04
[52] U.S. Cl. .................................... 358/437; 358/447; 358/486
[58] Field of Search ............... 358/437, 404, 444, 428, 358/463, 497, 486, 447, 336; 348/97, 98, 616; H04N 1/04

[56] References Cited

U.S. PATENT DOCUMENTS

| | | | |
|---|---|---|---|
| 4,160,279 | 7/1979 | Fawa | 358/288 |
| 4,531,133 | 7/1985 | Leng | 346/76 PH |
| 4,692,812 | 9/1987 | Hirahara et al. | 358/497 |
| 4,748,514 | 5/1988 | Bell | 358/288 |
| 4,754,143 | 6/1988 | Fukai et al. | 250/484.1 |
| 4,864,415 | 9/1989 | Beikirch et al. | 358/486 |
| 4,878,119 | 10/1989 | Beikirch et al. | 358/486 |
| 5,043,827 | 8/1991 | Beikirch | 358/471 |
| 5,125,042 | 6/1992 | Kerr et al. | 358/428 |
| 5,239,384 | 8/1993 | Stein et al. | 358/444 |

FOREIGN PATENT DOCUMENTS

0411954 6/1991 European Pat. Off. ........ H04N 1/04

*Primary Examiner*—Tommy P. Chin
*Assistant Examiner*—Huy Nguyen
*Attorney, Agent, or Firm*—Duane C. Basch

[57] ABSTRACT

A method and apparatus for reducing the distortion of image signals captured by an asynchronous scanning system during a transient period caused by temporarily disabling the scanning operation. Where in during normal operation, the asynchronous scanning system drives a document to be scanned relative to a scanning array which produces image signals representative of the document. Subsequently, the signals are transmitted to a host through an interface at a rate which may exceed the reception rate of the host, the asynchronous operation of the scanning system being regulated by start and stop signals which, respectively, enable and disable the scanning operation. The method used for reducing the image signal distortion during the transient period includes storing the image signals for the scanline acquired by the scanning array prior to disabling the scanning operation and storing at least one scanline of image signals for the scanlines acquired by the scanning array subsequent to restarting the scanning operation. Subsequently, the stored image signals are interpolated to generate additional scanlines of corrected image signals to replace those scanlines lost or those distorted while the scanning system was operating in the transient state.

21 Claims, 7 Drawing Sheets

METHOD AND APPARATUS FOR REDUCING IMAGE DISTORTION IN AN ASYNCHRONOUS INPUT SCANNER

BACKGROUND AND SUMMARY OF THE INVENTION

This invention relates generally to a digital image scanner, and more particularly to a method and apparatus capable of achieving the reduction or elimination of image loss and distortion during the asynchronous operation of such a scanner.

The features of the present invention may be used in the printing arts and, more particularly, in a digital image acquisition system. It is commonly known to utilize an asynchronous communication link, or interface, between a digital image scanner and a host processor used to receive digital signals produced by such a scanner. While the asynchronous operation of the interface enables the host and scanner to operate at different image data transmission rates, such a mismatch requires the scanner to adapt to situations when the image signal output rate exceeds the image signal input rate of the host processor. This may occur as a result of other processing being carried on within the host, or may be for reasons as simple as the limited processing speed of a dedicated host or its interface.

While it is known that such a mismatch in input/output (I/O) data rates can exist, attempts to compensate for the delay of output on the scanner side of the interface have generally employed either complicated buffering schemes requiring large amounts of memory, control of the scanning speed in proportion to the data rate mismatch, or the ability to start and stop the scanning process. The first alternative would require that the scanner be able to store up to a complete page of scanned image signals in memory so that the host system would be able to operate at any speed to retrieve the data on a page-by-page basis. Unfortunately, due to the large amount of memory required and the cost of memory, this alternative is prohibitively expensive for many digital scanning system, even to store a portion of the digitized image signals.

The second alternative, that of regulating the speed of the scanner with respect to the speed of the host, or more appropriately, the backlog of digital data which has not been transferred to the host, is utilized in the Xerox®7650 Pro Imager® scanner and described by Bell in U.S. Pat. No. 4,748,514 (Issued May 31, 1988), the relevant portions of which are hereby incorporated by reference. Bell discloses a scanner with a movable scanning array, wherein the speed of the array, and thus the rate at which image is captured, is regulated as a function of the residual capacity of a small data buffer used to store the image signals prior to transmitting them across an interface. In this manner, the asynchronous scanner attempts to substantially match the image signal output rate with the image signal input rate of the workstation. While viable, this alternative requires a scanning array which is driven by a precision drive and an encoder which is used to constantly monitor the displacement of the scanning array. In general, this results in an expensive motor and drive control system that may have a maximum scanning speed limitation as a result of the precision required for the scanning array.

Hence, the last alternative, that of a scanning system capable of start/stop operation, would appear to be the most inexpensive of the alternatives. Unfortunately, the latter alternative also lends itself to the creation of errors in the capture of image signals whenever the array is started or stopped, unless an expensive encoding system is employed to monitor the relative movement between the scanning array and the original document being scanned.

Other approaches have been devised to compensate for the loss of image signals during an image scanning operation, of which the following disclosures may be relevant:

U.S. Pat. No. 4,754,143 Patentee: Fukai et al. Issued: Jun. 28, 1988

U.S. Pat. No. 4,531,133 Patentee: Leng Issued: Jul. 23, 1985

U.S. Pat. No. 4,160,279 Patentee: Fuwa Issued: Jul. 3, 1979

The relevant portions of the foregoing patents may be briefly summarized as follows:

U.S. Pat. No. 4,754,143 to Fukai et al. discloses a scanning read-out apparatus having means to compensate for fluctuations in scanning speed. The apparatus includes means for detecting information recorded on a read-out objective and generating a signal representing the recorded readout information, means for detecting the scanning speed of a read-out scanner and generating a signal representing the read-out scanner speed, and means for performing a calculation using the signal representing the read-out scanner speed to generate a corrected read-out signal based upon the actual recorded read-out information and the detected speed of the read-out scanner.

U.S. Pat. No. 4,531,133 to Leng discloses a device for preventing the appearance of a blank line resulting from excessive travel or stretching of a recording paper when the recording information to be output is interrupted. The appearance of a blank line is eliminated by either recording an additional line based upon the last line recorded before the interruption is initiated, or by recording an additional occurrence of the first line of information received after the interruption has ended.

U.S. Pat. NO. 4,160,279 to Fuwa discloses an optical scanning system having a buffer memory and a data compression unit for compressing the digital signals generated by the optical scanning system. The data compression rate is a function of the proportion of high density areas of the document, thereby requiring the optical scanning system to automatically adjust the scanning rate to correlate with the data compression rate in order to avoid overfilling the buffer memory.

The present invention seeks to overcome limitations found in the related references and commercially available products by providing an improved method of minimizing or eliminating the distortion caused by the start/stop operation of the scanning system, without employing expensive encoding mechanisms.

In accordance with one aspect of the present invention, there is provided a method for reducing the distortion of image signals captured by an asynchronous scanning system during a transient period subsequent to disabling the scanning operation. During normal operation, the asynchronous scanning system drives a document to be scanned relative to a scanning array which produces image signals representative of the document. Subsequently, the signals are transmitted to a host through an interface at a rate which may exceed the rate at which the host can receive the image signals. Moreover, the asynchronous operation of the scanning system is regulated by start and stop signals which respectively enable and disable the scanning operation.

The method used for reducing the image signal distortion during the transient period includes storing the image signals for the actual scanline acquired by the scanning array immediately preceding the receipt of the stop signal and storing at least one scanline of image signals for the actual scanlines acquired by the scanning array subsequent to receipt of the start signal. Subsequently, the stored image signals are interpolated to generate at least one additional scanline of corrected image signals to replace scanlines lost or acquired while the scanning system was operating in the transient period.

Pursuant to another aspect of the present invention, there is provided an asynchronous scanning apparatus having a continuous velocity transport for driving a document relative to a scanning array, and an interface, electrically connected to the scanning array, through which the image signals are transmitted to a host at a rate exceeding that which the host can receive the image signals. The scanning apparatus includes a controller for regulating the asynchronous operation of the scanning system in response to the interface, whereby the operation of the continuous velocity transport and the acquisition of image signals by the scanning array are enabled or disabled in response to the ability of the host to receive additional image signals. The scanning apparatus is also able to reduce the distortion of image signals captured during a transient period, where the distortion is caused by disabling the operation of the continuous velocity transport. The image distortion reduction component of the scanning apparatus includes memory suitable for storing the image signals for an actual scanline acquired by the scanning array immediately preceding the disablement of the continuous velocity transport, as well as, at least one scanline of image signals acquired subsequent to restarting the operation of the continuous velocity transport. The image signals stored in the memory are subsequently used by an interpolator to generate at least one additional scanline of corrected image signals to replace those scanlines lost or acquire during the transient period.

The present invention will be described in connection with a preferred embodiment and method of use, however, it will be understood that there is no intent to limit the invention to that embodiment. On the contrary, the intent is to cover all alternatives, modifications, and equivalents as may be included within the spirit and scope of the invention as defined by the appended claims.

DESCRIPTION OF THE PREFERRED EMBODIMENT

The following description includes references to slow-scan and fast-scan digital image signals, when discussing the orientation of the sampled signals produced by the scanner. For purposes of clarification, signals collected along a fast-scan direction are intended to refer to individual pixels located in succession along a raster of image information, while signals collected in the slow-scan direction refers to signals from a common raster position across multiple rasters or scanlines. As an example, the term slow-scan would be used to describe signals captured from a plurality of elements along a linear photosensitive array as the array was moved relative to a document. On the other hand, the term fast-scan would refer to the sequential signals collected along the length of the linear photosensitive array during a single exposure period, and is also commonly referred to as a raster of data.

The following description also includes references to video image signals, or pixels, which may be either analog or digital voltage representations of the image, as provided from a suitable source. For example, the image data pixels may be obtained through line by line scanning of an image bearing original by one or more photosensitive elements, such as a multiple photosite array of charge coupled devices, commonly referred to as CCDs. Line by line scanning of an image bearing original for the derivation of image signals is well known and does not form a part of the present invention. Furthermore, for the purposes of the following description, it will be assumed that the video signals are digital signals that fall within a particular domain of values representing a greyscale.

Figure 1:
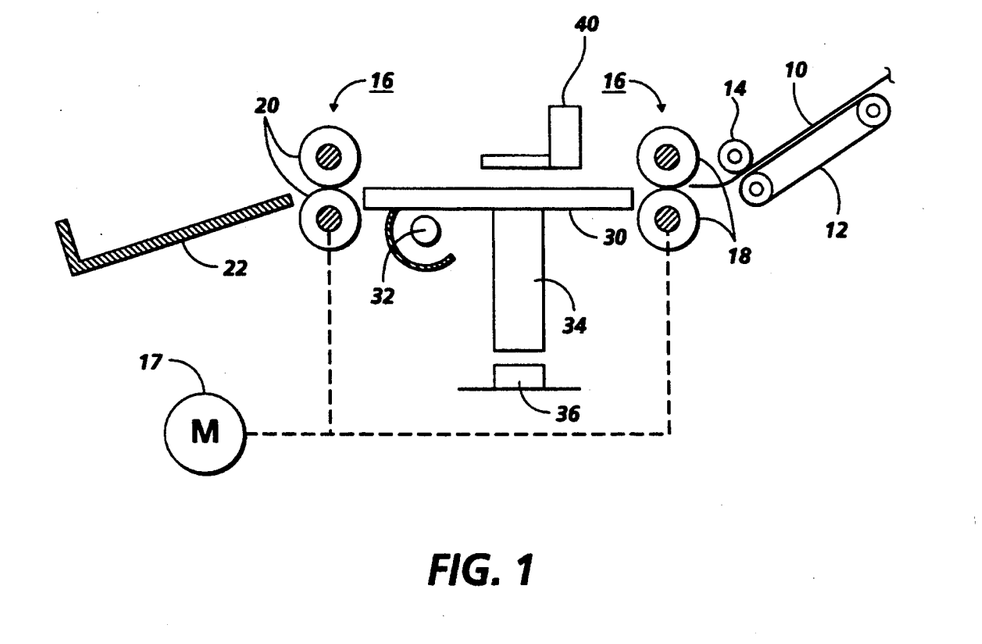
FIG. 1 is a schematic elevational view of an illustrative image scanner incorporating the features of the present invention.

For a general understanding of an input image scanner incorporating the features of the present invention, reference is made to the drawings. In the drawings, like reference numerals have been used throughout to designate identical elements. FIG. 1 shows one possible embodiment of a line by line image scanning device. Input tray 10 supports documents for feeding to an image position, via center retard belt feeder 12 and corresponding nip roll 14. Documents to be scanned are directed to a constant velocity transport (CVT) 16, driven by motor 17 and drivingly connected thereto via pulley drives (not shown), for the transport of document sheets across a scanning position. Documents are initially engaged by CVT 16 at a first set of rolls 18, which drive the sheet across an imaging position to a second set of rolls 20, which engage the documents until they are ejected into an output tray 22. During the operation of CVT 16, the document is advanced at a constant velocity, although no attempt is made to precisely monitor the progress of the document as it is advanced by the CVT. Accordingly, it is generally not possible to determine the document position, rather the position is, at most, approximated based upon the time that it has been engaged by the CVT.

The imaging position is defined by an imaging platen 30, which supports documents during the imaging process. Illuminator 32, typically comprising a lamp and reflector, is used in conjunction with SELFOC lens 34 (SELFOC is a trademark of the Nippon Glass Co, for its fiber array lens), which directs light supplied by illuminator 32 that is reflected from a document being scanned to a sensor array 36, in this case a CCD array of sensors. A start-of-scan detector (or registration detector) 40 signals the system when a lead edge of a document is entering the imaging position.

Figure 2A:
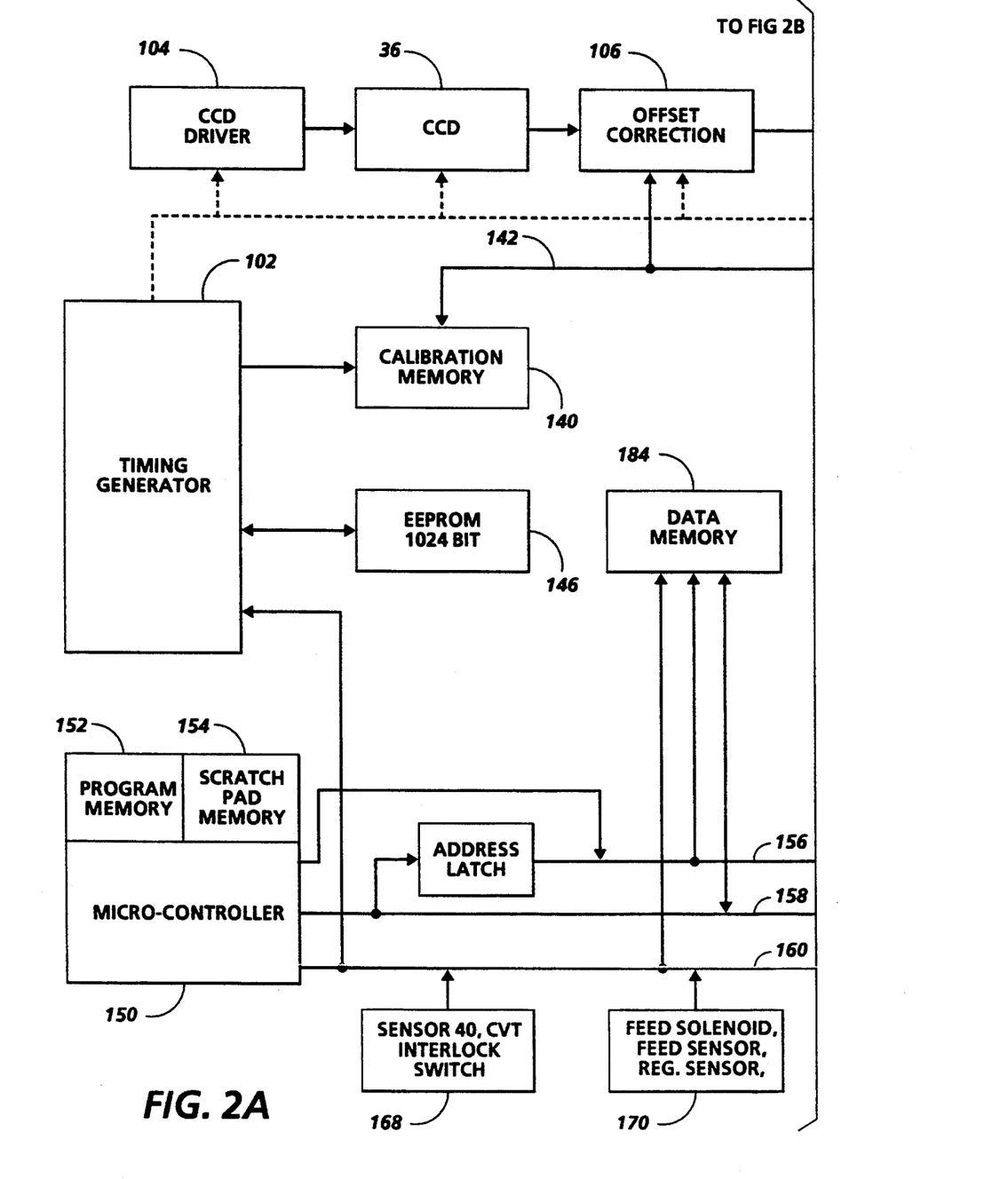
FIGS. 2A and 2B show a block diagram illustrating the FIG. 1 image scanning system.
Figure 2B:
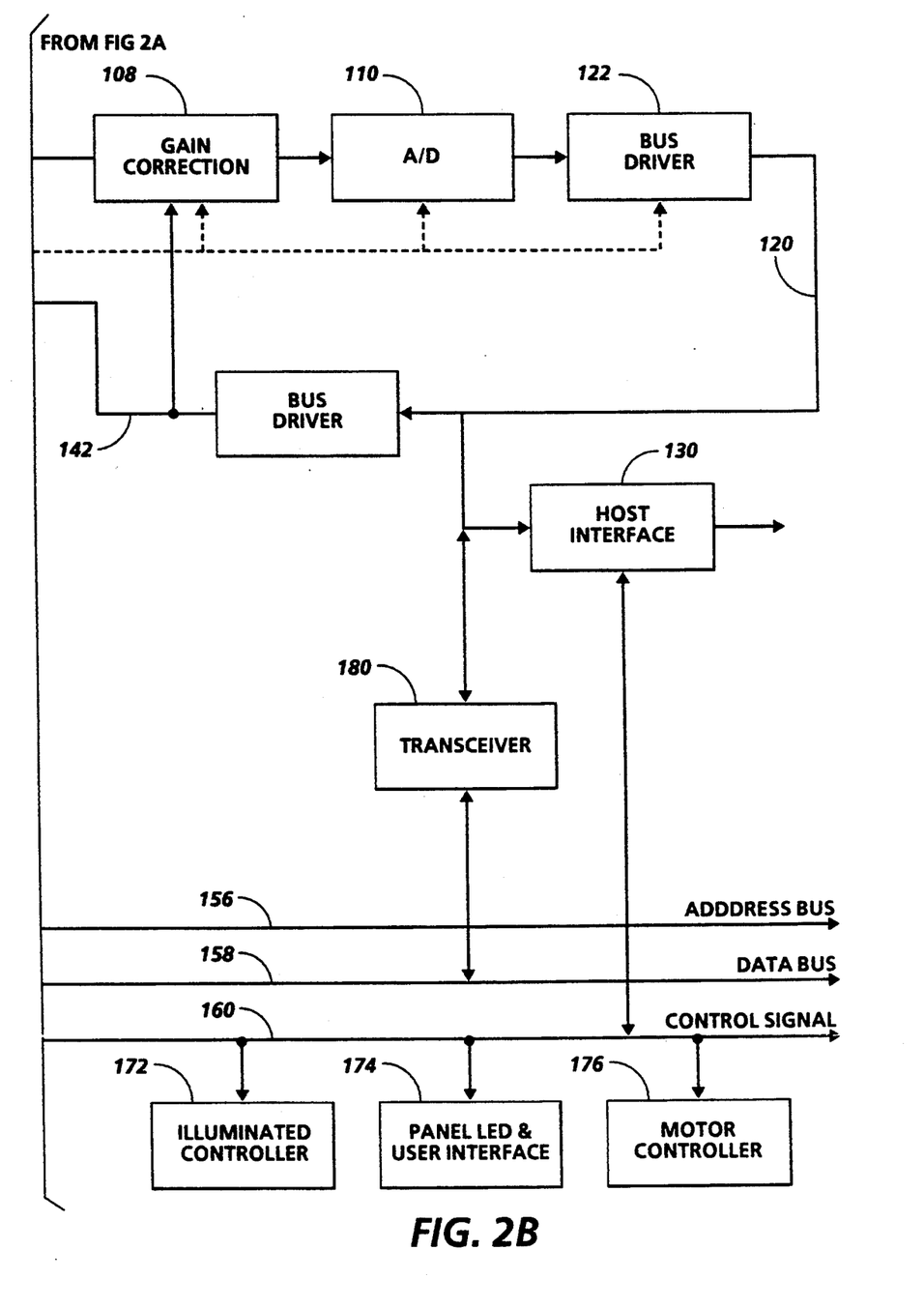

With reference now to FIGS. 2A and 2B, during operation of the scanner of FIG. 1, CCD array 36 is driven into an integrating condition periodically, in accordance with signals from a timing generator 102, and CCD driver 104. Analog values (small analog voltages) representing pixels or image data from each photosite are derived from CCD sensor array 36, and upon derivation, are directed to offset corrector 106 and gain corrector 108, for correction in accordance with a set of predetermined calibration coefficients stored in calibration memory 140. The analog pixel values are then converted to digital values at analog-to-digital (A/D) converter 110. Timing generator 102 provides pixel and scanline timing signals to the CCD driver 104, offset corrector 106, gain corrector 108, and analog-to-digital converter 110. Digital image data is then directed onto video data bus 120, controlled by video data bus driver 122, and eventually to host interface 130, where it is directed to other external devices.

Timing generator 102 also provides scanline and pixel timing signals to calibration memory 140, which may be a static RAM memory device. Correction values are directed from calibration memory 140 in accordance with timing signals from timing generator 102, to correction bus 142 from which correction data is directed to offset corrector 106 and gain corrector 108. Accordingly, correction data corresponding to each photosite is delivered to the correctors for each pixel in sequence. Timing generator 102 may be a programmable gate array device, controlled in accordance with an EEPROM device 146. Alternatively, timing generator 102 may be a masked gate array device, which does not require external program storage.

Microprocessor controller (microcontroller) 150 includes program memory 152, and scratch pad memory 154. Microcontroller 150 produces data on three main buses: address bus 156, data bus 158, and control signal bus 160. Control signal bus 160 receives control signals from the sensor group 168, including start of scan sensor 40 and CVT interlock switch (not shown), to provide mechanical control of the CVT. Control signal bus 160 also receives control signals from a feeder solenoid, a feeder sensor, and a feeder registration switch, illustrated as a single block 170. Control signal bus 160 provides control signals for operation of lamp controller 172 which regulates the output of illuminator 32, operation of an LED panel 174, and for motor controller 176, controlling motor 17. Microprocessor controller 150 may also provide control of timing generator 102.

On data bus 158, data produced or required by microprocessor controller 150 may be directed to and from external devices, or the video bus via transceiver 180, a bidirectional device, which is connected for bidirectional data transmission to and from video data bus 120, host interface 130, and data bus 158 in accordance with timing and control signals from timing generator 102 and microprocessor controller 150, as directed to transceiver 180. Control signal bus 160 directs control signals for control of data bus 158, which in turn carries data to and from transceiver 180, for storage in video data memory 184. Subsequently the data stored in memory 184 may be used as input for the interpolation of scanlines during asynchronous operation of the scanner, as will be hereinafter described in accordance with the present invention, or for calibration procedures.

With reference to host interface 130, the present invention assumes that either the host or the host interface contains some buffer memory (not shown), possibly a switchable buffer memory, also commonly referred to as ping-pong buffers. When such an arrangement is included in the host interface, it allows the scanner to generate the video data and fill the buffer while the alternate buffer is being transmitted to the host. Similar operation is accomplished by the placement of the buffer memory or dual buffers within the host. Generally, the dual buffer arrangement of host interface 130, or alternatively of the host, would also have the ability to signal the scanner whenever one of the dual buffers was unavailable for receiving new video data. For example, when the data rate of the host is less than the video data rate of the scanner, the mismatch will eventually require the asynchronous scanner to stop sending data, until the host has "caught up" with the scanner. While the dual buffers help to minimize the need for the scanner to stop, the buffers are intentionally small and generally able to hold little more than a single scanline of data each, in order to minimize the cost of the interface.

As previously described, the interface between the scanner and a suitable host includes a memory buffer suitable for buffering the transmission/receipt of the image signals. In addition, the scanner or host would also include memory sufficient for the storage of additional rasters of image signals. While shown in FIG. 2A as video memory 184, it is also possible to have an analogous memory block in the host for storage of the rasters of video signals. Moreover, such an arrangement would allow the host to execute the operations hereinafter described which are necessary to reduce or eliminate the image distortion in accordance with the present invention.

Figure 3:
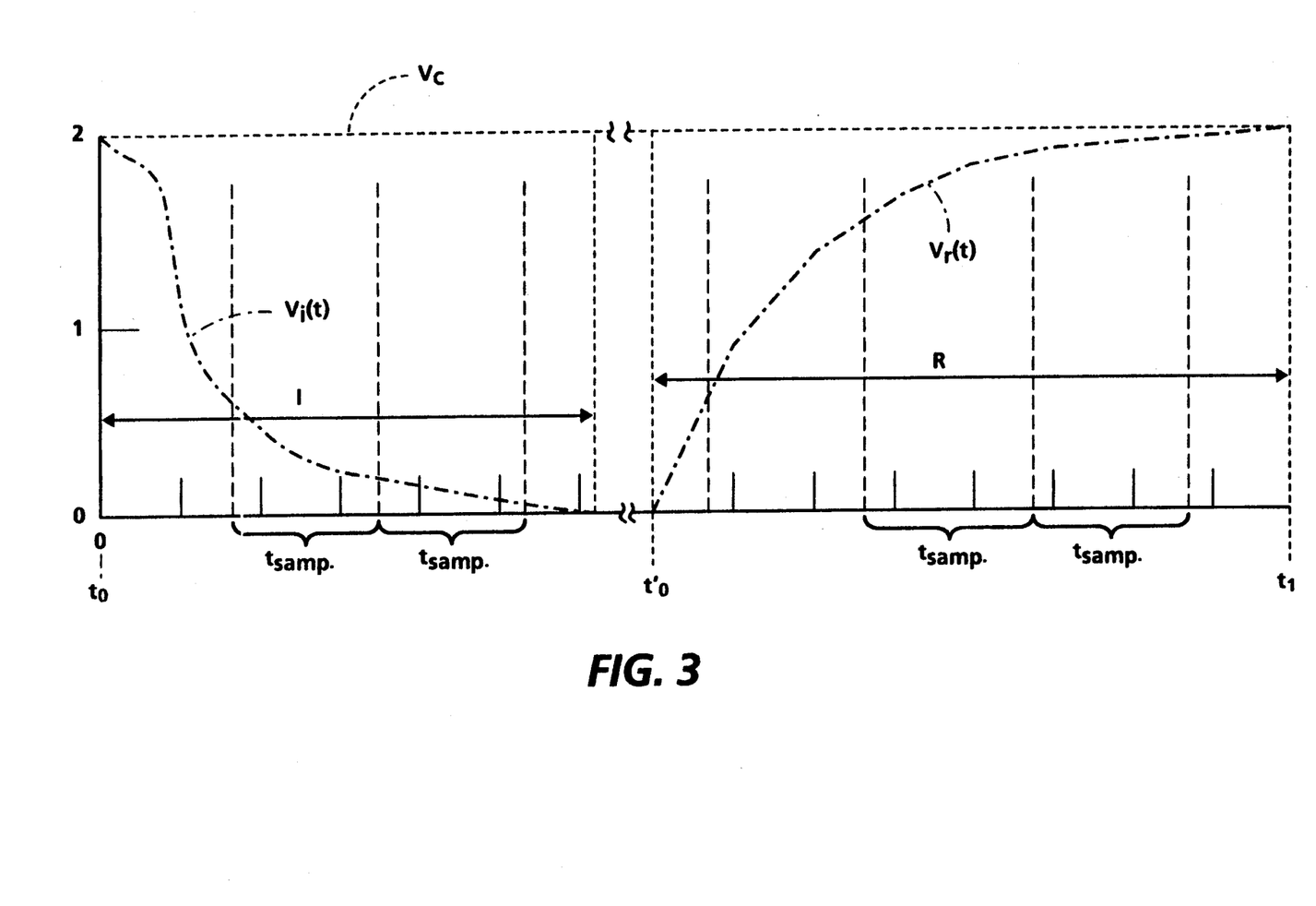
FIG. 3 is a graph showing typical velocity profiles for the continuous velocity document transport used in the FIG. 1 image scanner.

Referring also to FIG. 3, during the asynchronous scanning of a document, whenever the host interface detects that the alternate buffer is unavailable for receiving the output video data, a stop signal is generated and fed back to microcontroller 150 via control bus 160. When the stop signal is received by the microcontroller, it immediately enables the storage of video signals from the most recently acquired scanline in data memory 180, and further signals motor controller 176 to stop the operation of CVT motor 17, indicated by time $t_O$. Due to the inertia of the CVT drive system, including rolls 18 and 20, there is some additional advancement of the document subsequent to the time that the motor controller receives the stop signal. The velocity profile of the curve is shown as curve $V_i(t)$, which represents the inertial travel of the document during the transient period shown by 1, In addition, because the CCD is a continuously running device, timing generator 102 continues directing the acquisition of subsequent scanlines, even though they cannot be sent to the host. After receiving the stop signal and storing the last valid scanline, subsequent scanlines generated by CCD 36, in response to signals from timing generator 102, are ignored until the scanning process is restarted, or more specifically, until motor 17 is restarted at time $t_O'$, in response to a start signal issued by microcontroller 150. After restarting, and before reaching the nominal scanning speed ($V_c$) at the end of the transient ramp-up period R, the video signals generated by the CCD must be adjusted to account for the error in the position of the scanlines caused by the velocity of the document being less than the nominal velocity, as illustrated by curve $V_r(t)$. In the present invention, velocity profiles $V_s(t)$ and $V_r(t)$ would be generated from empirical data obtained during the characterization of the document transport system, and would therefore be representative of typical acceleration and deceleration behavior of the CVT system.

In order to "fill in" or correct for the scanlines which are lost during the transient ramp-down, or inertial travel period (I) subsequent to receiving the stop signal, the present invention utilizes signals from the last valid scanline prior to receipt of the stop signal, in conjunction with at least one scanline generated subsequent to reestablishing the scanning operation to generate one or more scanlines of representative video signals. As the present invention relies upon the establishment of valid scanlines, subsequent to receiving the start signal, to generate the missing or lost scanlines, the following description will first detail the method for replacing the scanlines lost during the transient ramp-up period following the start signal. Once the scanlines are determined for the transient ramp-up period, one or more of the correct ramp-up scanlines may be used in conjunction with the last valid scanline prior to the stop signal, to generate signals for the scanlines lost during the inertial travel, or ramp-down, period.

Figure 4:
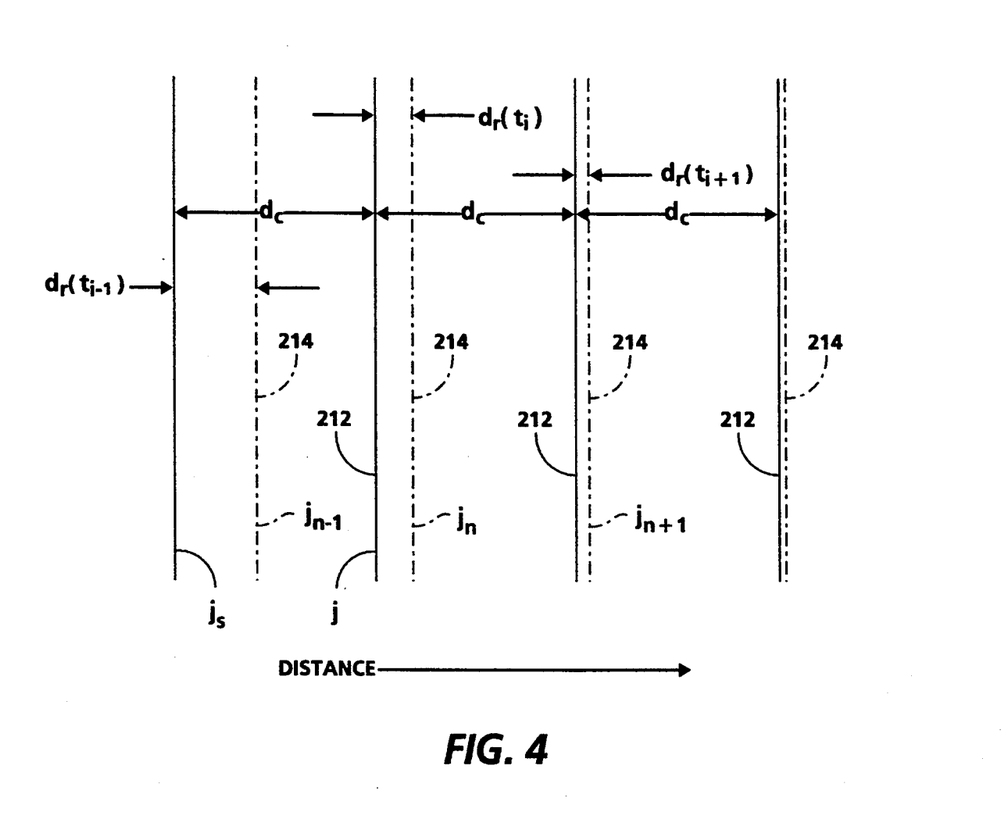
FIGS. 4 and 5 are illustrations of the relative positions of actual and corrected scanline locations that are typical upon restarting a scanning operation with a continuous velocity document transport.

Referring now to FIG. 3 in conjunction with FIG. 4, which depicts the relative positions of actual and desired scanline sampling positions as a function of distance, the distance traveled by the document during the transient ramp-up period being indicated by R. In order to determine the correct sampling point distance ($d_c$), the correct number of scanlines ($N_c$) over the transient ramp-up period must first be determined. This value may be calculated from the Slow Scan Sampling Rate ($S_r$) and the transient ramp-up period (R), as shown by the following equation:

$$N_c = S_r \times R \qquad (1)$$

As shown on FIG. 3, the sample period $t_{samp}$ is constant regardless of the document speed, which in turn results in the variation between the desired and actual sampling positions, positions 212 and 214, respectively, when the speed of the document varies. Continuing, the correct sampling distance ($d_c$) is the distance between each scanline when the motor is operating at nominal speed, $V_c$, as shown in FIG. 3, and may be calculated by Equation 2.

$$d_c = V_c \div S_r \qquad (2)$$

Furthermore, the spatial distance traveled by the document sheet, or alternatively the scan carriage, during transient period R may be represented as the area under velocity profile $V_r(t)$ as follows:

$$d_R(t) = \int V_r(t). \qquad (3)$$

Therefore, the correct number of scanlines ($N_c$) that should be produced over the transient ramp-up period may be calculated by equating the total distance traveled by the document during transient period, ($N_c \times d_c$) to $d_R$, as determined in Equation 3, to arrive at.

$$N_c \times d_c = \int V_r(t) \text{ where } 0 \leq t \leq R. \qquad (4)$$

Solving Equation 4 for $N_c$ produces $$N_c = \int V_r(t) \div d_c, \text{ where } 0 \leq t \leq R. \qquad (5)$$

Having determined the desired or correct sampling positions, 212, as shown in FIG. 4, in relation to the actual scanline sampling positions, 214, pixel signals from one or more of the neighboring actual scanlines must be used to generate the signals which are representative of the document image at the desired scanline sampling positions.

In order to correct for the inaccurate sampling that occurs during the transient ramp-up state, interpolation, relative to the nearest correct scanline sample point, is used to generate the "corrected" output pixel signals. The present invention employs a linear interpolation scheme to generate the correct scanline signals $l_O(i,j)$ as shown by Equation 6, which is used for the interpolation operation.

$$l_O(i,j) = \Sigma[C_k \times l_I(i,k)], \qquad (6)$$

where $k = j_{n-1}$ to $j_{n+1}$, $j_s \leq j \leq N_c + j_s$, $0 \leq i \leq$ pixels per line, and where $l_I(i,j)$ is the input pixel signal at position (i,j)
$l_O(i,j)$ is the output pixel signal at position (i,j)
$C_k$ is the coefficient value at scanline k
i is the fast-scan pixel index under consideration
j is the scanline index under consideration
$j_s$ is the scanline index corresponding to the last scanline after the document stopped, and
$j_n$ is the scanline index corresponding to the to the nearest scanline in the transient data to scanline (j) by the spatial distance of ($d_c \times (j - j_s)$)

The nearest scanline ($J_n$) in the transient ramp-up period that corresponds to the desired output scanline (j) is defined by the spatial distance ($d_c \times (j - j_s)$) and may be calculated by equating Equation 3 to the spatial distance to determine the time ($t_1$) taken to travel the spatial distance ($d_c \times (j - j_s)$). Thus, $$d_c \times (j - j_s) = \int V_r(t), \qquad (7)$$

where $$t_0' \leq t \leq t_1.$$

Solving for $t_l$, the number of scanlines produced over the spatial distance ($d_c \times (j - j_s)$) is ($S_r \times t_1$). Accordingly, the nearest scanline ($j_n$), in the transient ramp-up period that corresponds to scanline (j) within the spatial distance ($d_c \times (j - j_s)$), may be calculated by Equation 8:

$$j_n = INT[j_s + S_r \times t_1]. \qquad (9)$$

Figure 5:
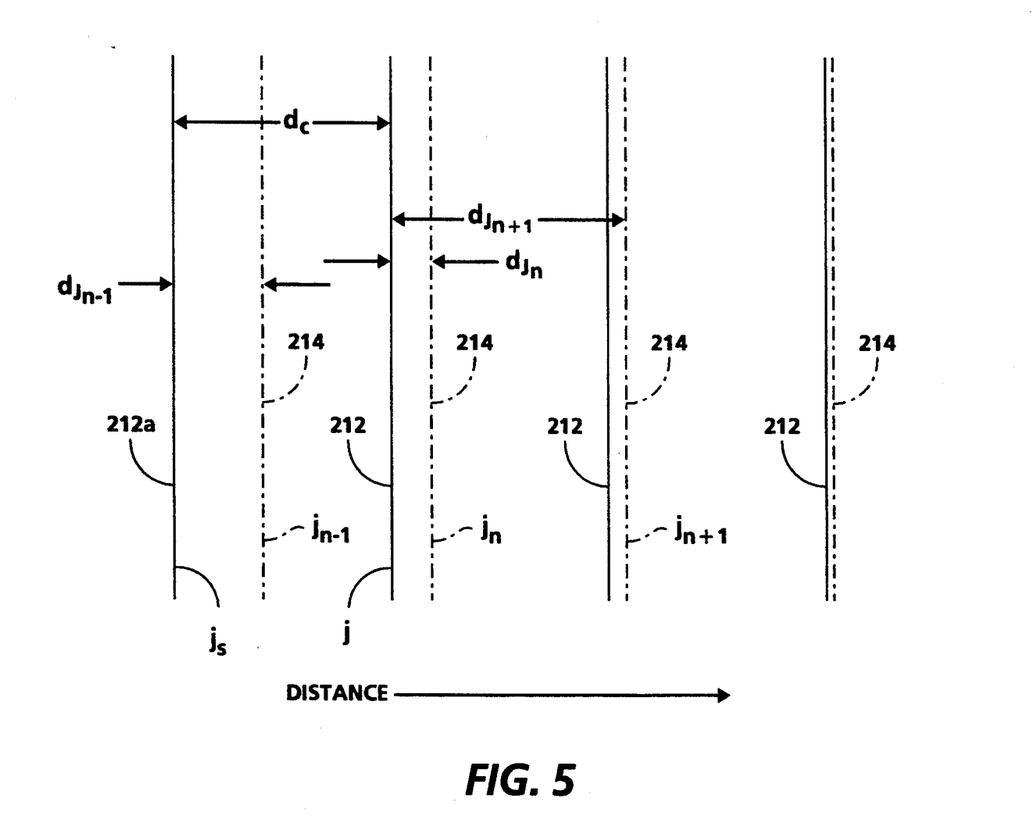

Furthermore, the coefficients, $C_k$, are inversely proportional to the distance from scanline k to the correct sample point ($d_c \times (j - j_s)$), where $k = j_{n-1}$ to $j_{n+1}$. Therefore, determination of the interpolation coefficients requires the calculation of the distance from the correct sample point, j, to scanlines $j_{n-1}$, $j_n$, and $j_{n+1}$ as shown in FIG. 5.

First, the sample times for actual scanlines $j_n - 1$ through $j_{n+1}$, inclusive, are calculated by Equations 9a, 9b and 9c, to determine the distance from the sample point to the actual scanlines.

$$t_{j_{n-1}} = 1 \div S_r \times (j_{n-1} - j_s) \quad (9a)$$

$$t_{j_n} = 1 \div S_r \times (j_n - j_s) \quad (9b)$$

$$t_{j_{n+1}} = 1 \div S_r \times (j_{n+1} - j_s) \quad (9c)$$

Next, it is necessary to determine the separation distances between the actual scanline sampling positions and the desired scanline sampling positions in order to correctly calculate interpolation factors ($C_k$) for each set of actual scanline signals. Referring to FIG. 5, which illustrates the respective distances, the distance from the correct sample point j to scanlines $j_{n-1}$, $j_n$, and $j_{n+1}$ are calculated by Equations 10a, 10b and 10c below:

$$d_{j_{n-1}} = ABS\left[(d_c \times (j - j_s)) - \int_{t_0}^{t_{j_{n-1}}} V_r(t)\right], \quad (10a)$$

$$d_{j_n} = ABS\left[(d_c \times (j - j_s)) - \int_{t_0}^{t_{j_n}} V_r(t)\right], \text{ and} \quad (10b)$$

$$d_{j_{n+1}} = ABS\left[(d_c \times (j - j_s)) - \int_{t_0}^{t_{j_{n+1}}} V_r(t)\right], \quad (10c)$$

where ($d_c \times (j - j_s)$) is the correct sampling position for the scanline under consideration, and $\int V_r(t)$, is the distance traveled from time $t_O$ until the actual scanline sample is taken during the transient ramp-up period, as shown in FIG. 4. Once the relative distances between the scanlines are determined, interpolation coefficients $C_k$ may be generated as represented by Equations 11a, 11b and 11c:

$$C_{j_{n-1}} = a \div [d_{j_{n-1}}], \quad (11a)$$

$$C_{j_n} = a \div d_{j_n}, \quad (11b)$$

$$C_{j_{n+1}} = a \div [d_{j_{n+1}}], \quad (11c)$$

where $$a = 1 \div ([1 \div d_{j_n}] + [1 \div d_{j_{n-1}}] + [1 \div d_{j_{n+1}}]). \quad (11d)$$

Having determined interpolation coefficients $C_k$, the pixel signals for the actual scanlines, $l_i(i,j)$, can then be interpolated as indicated by Equation 6, to produce pixel signals representative of the desired or corrected scanline positions 212, as represented by $l_o(i,j)$.

Figure 6:
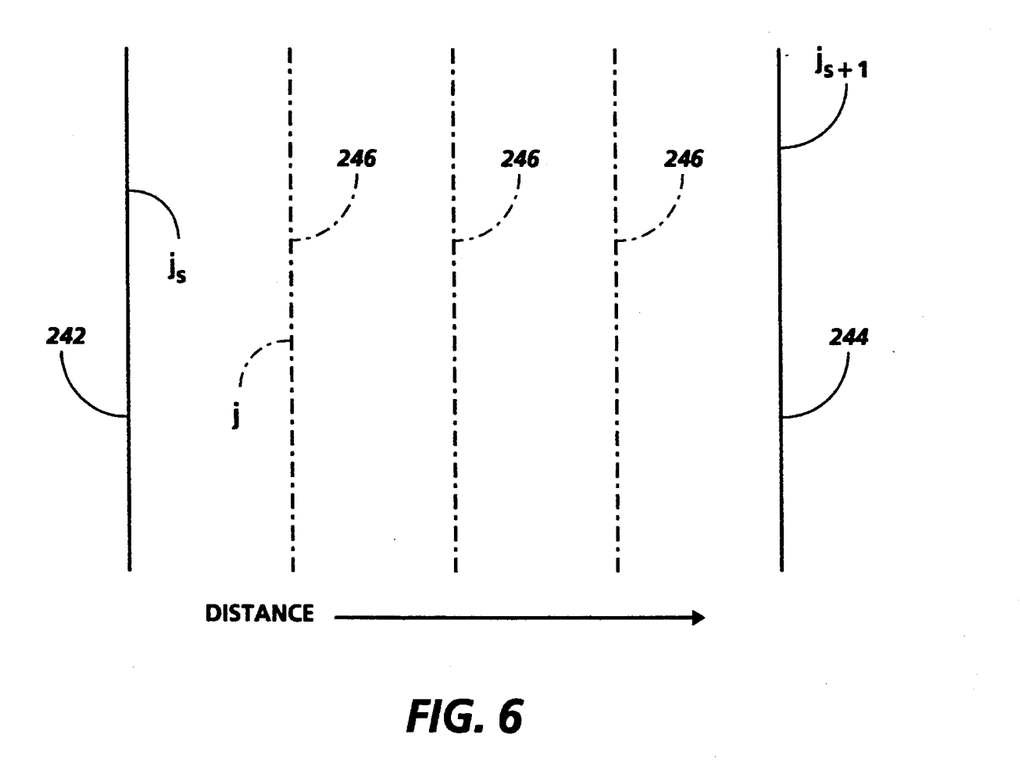
FIG. 6 an illustration of the relative positions of actual and corrected scanline locations that are typical when interrupting a scanning operation with a continuous velocity document transport.

Following the generation of at least the first correct scanline of pixel signals, an additional interpolation operation is used to generate correct pixel signals for those scanlines which were lost during the transient ramp-down, or inertial travel period, represented as 1 in FIG. 3. Referring to FIG. 6, where a representative set of actual and corrected scanlines are illustrated with respect to one another, the linear interpolation requires the actual scanline signals captured just before the scanner is stopped, actual scanline 242, in response to the stop signal, and the corrected scanline after the scanner is restarted, corrected scanline 244, as generated using Equation 6. Alternatively, the interpolation may use the actual scanline signals generated after the scanner restarts in place of the corrected scanline signals, for example, the signals which comprise scanline 212a of FIG. 5. However, the treatment for generation of the correct scanline signals during the transient inertial state is essentially similar. The number of scanlines to be inserted, $N_i$, having been derived experimentally, is based upon the observed travel of the document caused by the inertial rotation of the CVT rolls subsequent to receipt of the stop signal from microcontroller 150 of FIG. 2A. Empirically, this is determined to be the area under the inertial velocity curve, $V_i(t)$, illustrated in FIG. 3. Once the distance of document travel is characterized, the number of scanlines is then determined by dividing the inertial travel distance by the slow-scan resolution of the scanner. Subsequently, the number of scanlines to be inserted is used to define the number of iterations over which the interpolation operation of Equation 12 must be performed to create the correct scanline signals, $l_o(i,j)$, as follows:

$$l_o(i,j) = a_j \times l_i(i,j_s) + a_{j+1} \times l_i(i,j_{s+1}), \quad (12)$$

where
$j = j_s + 1, j_s < j < N_i + j_s, 1 \leq l \leq N_i, 0 \leq i \leq$ pixel per line, and where $N_i$ is the number of scanlines to be inserted,
$l_i(i,j)$ is the input pixel signal at (i,j),
$l_o(i,j)$ is the output pixel signal at (i,j),
$a_k$ is the coefficient value at scanline k,
i is the fast-scan pixel index under consideration,
j is the scanline index under consideration,
$j_s$ is the scanline index corresponding to the last scanline after the scanner stopped, and
l is the integer index value for the scanline to be inserted.

The interpolation coefficients for Equation 12, $a_j$ and $a_{j+1}$, are determined based upon the positional relationship between the scanline under consideration, j, and scanlines 242 and 244, $j_s$ and $j_{s+1}$, respectively, as shown in equations 13a and 13b:

$$a_j = \beta \div l \quad (13a)$$

$$a_{j+1} = \beta \div (N_i + 1 - l), \quad \text{and (13b)}$$

where $$\beta = 1 \div ([1 \div l] + [1 \div (N_i + 1 - l)]). \quad (13c)$$

Once determined, the coefficients are applied to the input pixel signals $l_i(i,j)$, as indicated by interpolation Equation 12, and the output pixel signals $l_o(i,j)$ are generated for the corrected scanline positions, j, indicated by reference numerals 246, thereby producing interpolated pixel signals to replace those which are lost during the transient inertial state.

In recapitulation, the present invention is a method for generating replacement video or pixel signals during transient periods in the operation of an asynchronous scanner. The invention enables the use of one or more actual scanlines of pixel signals in a pair of interpolation operations which produce the replacement signals. More specifically, the invention utilizes a first interpolation operation to generate one or more scanlines of pixel signals for replacement of scanlines which are acquired during a transient ramp-up period where the relative velocity of the document with respect to the scanning array is not constant. Once the transient ramp-up image signals have been regenerated from the actual image signals, those image signals similarly lost during the transient inertial travel period are regenerated in a similar fashion, by interpolation, using at least one scanline of image signals representing a scanline acquired during the transient ramp-up period.

The present invention thereby enables the use of a continuous velocity document transport system within an asynchronous scanner without introducing unacceptable image distortion. Hence, the present invention employs a robust method for generating video signals to minimize the error associated with scanning operations carried on during the transient periods, and further eliminates the need for large memory buffers or variable-speed, high-precision drive components generally associated with asynchronous input scanners.

It is, therefore, apparent that there has been provided, in accordance with the present invention, a method and apparatus for reducing image distortion in an asynchronous input scanner, thereby fully satisfying the aims and advantages hereinbefore set forth. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method of reducing image signal distortion in an asynchronous input scanning system operating in a transient state between receiving a stop signal and the asynchronous input scanning system returning to a nominal velocity in response to a start signal, comprising the steps of:
   (a) storing a plurality of image signals for a first scanline acquired immediately before receiving the stop signal in a first memory location;
   (b) storing a plurality of image signals for at least one subsequent scanline generated after receiving the start signal in a second memory location; and
   (c) generating, as a function of the image signals stored in both the first and second memory locations, a plurality of corrected image signals to replace scanlines of image signals lost while the asynchronous input scanning system was operating in the transient state.

2. A method of reducing image signal distortion in an asynchronous input scanning system operating in a transient state between receiving a stop signal and the asynchronous input scanning system returning to a nominal velocity in response to a start signal, comprising the steps of:
   (a) storing a raster of image signals for a first scanline acquired immediately before receiving the stop signal in a first memory location;
   (b) storing a raster of image signals for at least one subsequent scanline generated after receiving the start signal in a second memory location; and
   (c) generating, as a function of the image signals stored in both the first and second memory locations, a plurality of corrected image signals to replace scanlines of image signals lost while the asynchronous input scanning system was operating in the transient state, including the steps of:
      (i) determining the number of scanlines lost during a transient ramp-down period;
      (ii) determining at least one set of interpolation factors based upon the relative spatial relationship between the correct positions of lost scanlines and the positions of the first and subsequent scanlines acquired and stored in the first and the second memory locations; and
      (iii) generating, as a function of the interpolation factors, at least one raster of corrected image signals to replace the scanlines of image signals lost during the transient ramp-down period.

3. The method of claim 2, wherein the step of generating at least one raster of corrected image signals comprises the steps of:
   (a) retrieving a first image signal from said first memory location, said first image signal being representative of the $n^{th}$ pixel position of the first scanline;
   (b) retrieving a second image signal from said second memory location, said second image signal being representative of the $n^{th}$ pixel position of the scanline generated subsequent to the receipt of the start signal in a second memory location;
   (c) interpolating, based upon the relative values of a set of interpolations factors, the first and second image signals to generate a corrected image signal, said corrected image signal being representative of the $n^{th}$ pixel position of the raster of corrected image signals; and
   (d) repeating steps (a) through (c) above until all pixel positions have been processed, thereby generating the raster of corrected image signals to replace a scanline of image signals lost during the transient ramp-down period.

4. The method of claim 3, further including the steps of:
   selecting a second set of interpolation factors representative of a second correct scanline position; and
   repeating steps (a) through (d) of claim 3 to generate a second raster of corrected image signals to replace a second scanline of image signals lost during the transient ramp-down period.

5. A method of reducing image signal distortion in an asynchronous input scanning system operating in a transient state between receiving a stop signal and the asynchronous input scanning system returning to a nominal velocity in response to a start signal, comprising the steps of:
   (a) storing a raster of image signals for a first scanline acquired immediately before receiving the stop signal in a first memory location;
   (b) storing a raster of image signals for at least one subsequent scanline generated after receiving the start signal in a second memory location;
   (c) generating, as a function of the image signals stored in both the first and second memory locations, a plurality of corrected image signals to replace at least one raster of image signals lost while the asynchronous input scanning system was operating in the transient state; and
   generating, as a function of the image signals stored in the second memory location, a plurality of corrected image signals to be substituted for at least one raster of image signals acquired while the scanning system was operating in a transient ramp-up period, between receipt of the start signal and achieving the nominal scanning velocity.

6. The method of claim 5, wherein the step of generating a plurality of corrected scanline signals for substitution comprises the steps of:
   (a) determining the correct position of a scanline during the transient ramp-up period;

(b) identifying at least two actual scanlines spaced apart from the correct scanline position, the image signals for the actual scanlines being stored in the second memory location;

(c) determining, as a function of the spatial relationships between the correct scanline position and the actual scanline positions, a set of interpolation factors; and (d) using the interpolation factors, generating a raster of corrected image signals to be substituted for image signals acquired by the asynchronous input scanning system during the transient ramp-up period.

7. The method of claim 6, wherein the step of generating a raster of corrected image signals further comprises the steps of:

(a) retrieving a first image signal from the second memory location, said first image signal being representative of the $n^{th}$ pixel position of a first scanline stored in the second memory;

(b) retrieving at least one additional image signal from the second memory location, said additional image signal being representative of the $n^{th}$ pixel position of a second scanline stored in the second memory;

(c) interpolating, as a function of the relative values of the set of interpolation factors, the first and at least one additional image signal to generate a corrected image signal, wherein the corrected image signal is representative of the $n^{th}$ pixel position of the correct scanline position; and (d) repeating steps (a) through (c) above until all pixel positions have been processed, thereby generating the raster of corrected image signals to be substituted for those scanlines actually acquired during the transient ramp-up period.

8. A method of reducing image signal distortion in an asynchronous input scanning system operating in a transient state between receiving a stop signal and the asynchronous input scanning system returning to a nominal velocity in response to a start signal, comprising the steps of:

(a) storing, in a first memory location, a raster of image signals for an actual scanline acquired by the asynchronous input scanning system immediately preceding the receipt of the stop signal (b) storing, in a second memory location, at least one raster of image signals for a scanline acquired by the asynchronous input scanning system subsequent to receipt of the start signal; and (c) interpolating the image signals stored in the first and second memory locations to generate at least one additional raster of corrected image signals to replace a scanline lost while the asynchronous input scanning system was operating in the transient state.

9. A method of reducing image signal distortion in an asynchronous input scanning system operating in a transient state between receiving a stop signal and the a synchronous input scanning system returning to a nominal velocity in response to a start signal, comprising the steps of:

(a) storing, in a first memory location, a raster of image signals for an actual scanline acquired by the asynchronous input scanning system immediately preceding the receipt of the stop signal (b) storing, in a second memory location, at least one raster of image signals for a scanline acquired by the asynchronous input scanning system subsequent to receipt of the start signal; and (c) interpolating the image signals stored in the first and second memory locations to generate at least one additional raster of corrected image signals to replace a scanline lost while the asynchronous input scanning system was operating in the transient state, including the step of interpolating the image signals stored in the second memory location to produce at least one corrected raster of image signals, said raster of corrected image signals representing a desired scanline sampling position during a transient ramp-up period, and wherein the interpolation is carried out as a function of the length of the transient ramp-up period required to achieve the nominal scanning velocity subsequent to the re-enablement of a scanning operation in response to the start signal.

10. The method of claim 9, wherein the step of interpolating the stored image signals further comprises the steps of:

(a) identifying all desired scanline sampling positions during the transient ramp-up period;

(b) selecting one of the desired scanline sampling positions as a target scanline, wherein the target scanline is representative of a scanline that the asynchronous input scanning system failed to acquire at the desired scanline sampling position while operating in the transient state;

(c) calculating interpolation coefficients for the target scanline;

(d) interpolating, using image signals for at least two scanlines stored in the second memory location, to produce a raster of image signals for the target scanline; and (e) if a plurality of desired scanline sampling positions exit, as identified in step (a), repeating steps (b) through (d) above to produce corrected scanlines for each of the desired scanline sampling positions identified in step (a).

11. The method of claim 10, wherein the step of identifying all desired scanline sampling positions comprises the steps of:

(a) estimating the total distance traveled by a document being scanned by the asynchronous input scanning system during the transient ramp-up period;

(b) calculating, based upon a predefined scanline resolution, the number of scanlines that the asynchronous input scanning system failed to acquire at desired scanline sampling positions over the total distance of step (a);

(c) calculating a uniform separation distance for the desired scanline sampling positions as a function of the total distance and the number of scanlines calculated in step (b), thereby identifying desired sampling positions for the scanlines which are spaced apart by the separation distance.

12. The method of claim 11, wherein the step of calculating interpolation coefficients for the target scanline comprises the steps of:

(a) identifying the separation distances between the target scanline and the position of at least one scanline on both sides of the target scanline, for which image signals have been stored in the second memory location;

(b) calculating a normalization factor as a function of the separation distances identified in step (a); and (c) calculating, based upon the separation distances and the normalization factor, interpolation coefficients for the target scanline.

13. The method of claim 9, wherein the step of interpolating the image signals stored in the first and second memory locations further includes the step of interpolating the image signals stored in the first memory location with a first raster of corrected image signals representing a desired scanline sampling position during the transient ramp-up period to produce a second raster of corrected image signals lost during a transient inertial travel period, and wherein the interpolation is a function of the length of a transient inertial travel period required to halt the relative motion between a document being scanned and the asynchronous input scanning system subsequent to receipt of the stop signal.

14. The method of claim 13, wherein the step of interpolating the image signals stored in the first memory location with a first raster of corrected image signals to produce a second raster of corrected image signals further comprises the steps of:

(a) identifying all desired scanline sampling positions during the transient inertial travel period;

(b) selecting one of the desired scanline sampling positions as a target scanline, wherein the target scanline is representative of a scanline that the asynchronous scanning system failed to acquire at the desired scanline sampling position while operating in the transient state;

(c) calculating interpolation coefficients for the target scanline;

(d) interpolating, using image signals stored in the first memory location and image signals comprising the first raster of corrected image signals, to produce the second raster of corrected image signals for the target scanline; and (e) if a plurality of desired scanline sampling positions exist, as identified in step (a), repeating steps (b) through (d) to produce additional corrected scanlines for each of the desired scanline sampling positions identified in step (a).

15. The method of claim 14, wherein the step of identifying all desired scanline sampling positions comprises the steps of:

(a) estimating the total distance traveled by a document being scanned by the asynchronous input scanning system during the transient inertial travel period;

(b) calculating, based upon a predefined scanline resolution, the number of scanlines that the asynchronous scanning system failed to acquire at desired scanline sampling positions over the total distance of step (a); and (c) calculating a uniform separation distance for the desired scanline sampling positions by dividing the total distance by the number of scanlines calculated in step (b), thereby identifying desired sampling positions for the scanlines which are spaced apart by the separation distance.

16. The method of claim 15, wherein the step of calculating interpolation coefficients comprises the steps of:

(a) identifying a first separation distance between the target scanline and the position of a first scanline having image signals stored in the first memory location;

(b) identifying a second separation distance between the target scanline and the position of the first raster of corrected image signals;

(c) calculating a normalization factor by summing the first and second separation distances; and (d) calculating, based upon the first and second separation distances and the normalization factor, interpolation coefficients for the target scanline.

17. An asynchronous scanning apparatus having a continuous velocity transport for driving a document relative to a scanning array which produces image signals representative of the document, comprising:

a host adapted to receive image signals;

an interface, electrically connected to the scanning array, through which the image signals are transmitted to the host at a rate which exceeds the rate at which the host can receive the image signals;

control means for regulating the asynchronous operation of the scanning system in response to the interface, said control means enabling or disabling the operation of the continuous velocity transport and the acquisition of image signals by the scanning array in response to an indication from the host that it is prepared to receive additional image signals;

means for reducing the distortion of the image signals scanned during a transient period caused by disabling the operation of the continuous velocity transport, said distortion reducing means including first memory means for storing the image signals for the actual scanline acquired by the scanning array immediately preceding the disablement of the continuous velocity transport, second memory means for storing at least one scanline of image signals for scanlines acquired subsequent to a re-starting of the operation of the continuous velocity transport, and means for interpolating the image signals stored in the first and second memory means to generate at least one additional scanline of corrected image signals to replace scanlines lost during the transient period.

18. The apparatus of claim 17, wherein said interpolation means includes primary interpolation means for interpolating only the image signals stored in said second memory means to produce image signals representing at least one corrected scanline of image signals, so that the corrected scanline represents a desired scanline position within a transient ramp-up period.

19. The apparatus of claim 18, wherein the transient period includes a transient ramp-up period, the length of which is determinable by the relative offset between the scanning array and the document prior to the document achieving a nominal scanning velocity and subsequent to the re-enablement of a scanning operation, and where the primary interpolation means operates as a function of the length of the transient ramp-up period.

20. An asynchronous scanning apparatus having a continuous velocity transport for driving a document relative to a scanning array which produces image signals representative of the document, comprising:

a host adapted to receive image signals;

an interface, electrically connected to the scanning array, through which the image signals are transmitted to the host at a rate which exceeds the rate at which the host can receive the image signals;

control means for regulating the asynchronous operation of the scanning system in response to the interface, said control means enabling or disabling the operation of the continuous velocity transport and the acquisition of image signals by the scanning array in response to an indication from the host that it is prepared to receive additional image signals;

means for reducing the distortion of the image signals scanned during a transient period caused by disabling the operation of the continuous velocity transport, said distortion reducing means including, first memory means for storing the image signals for the actual scanline acquired by the scanning array immediately preceding the disablement of the continuous velocity transport, second memory means for storing at least one scanline of image signals for scanlines acquired subsequent to a restarting of the operation of the continuous velocity transport, and means for interpolating the image signals stored in the first and second memory means to generate at least one additional scanline of corrected image signals to replace scanlines lost during the transient period, wherein said interpolation means further includes primary interpolation means for interpolating only the image signals stored in said second memory means to produce image signals representing at least one corrected scanline of image signals, so that the corrected scanline represents a desired scanline position within a transient ramp-up period, and secondary interpolation means for interpolating the image signals stored in said first memory means with the image signals generated by said primary interpolation means to produce a second corrected scanline of image signals representing a desired scanline position occurring within a transient inertial travel period.

21. The apparatus of claim 20, wherein the transient period includes a transient inertial travel period, the length of which is determinable by the relative offset between the scanning array and the document subsequent to disabling the driving of the document and prior to stopping further relative motion between the document and the scanning array, and where the secondary interpolation means operates as a function of the length of the transient inertial travel period.

* * * * *